United States Patent Office 3,358,107
Patented Dec. 12, 1967

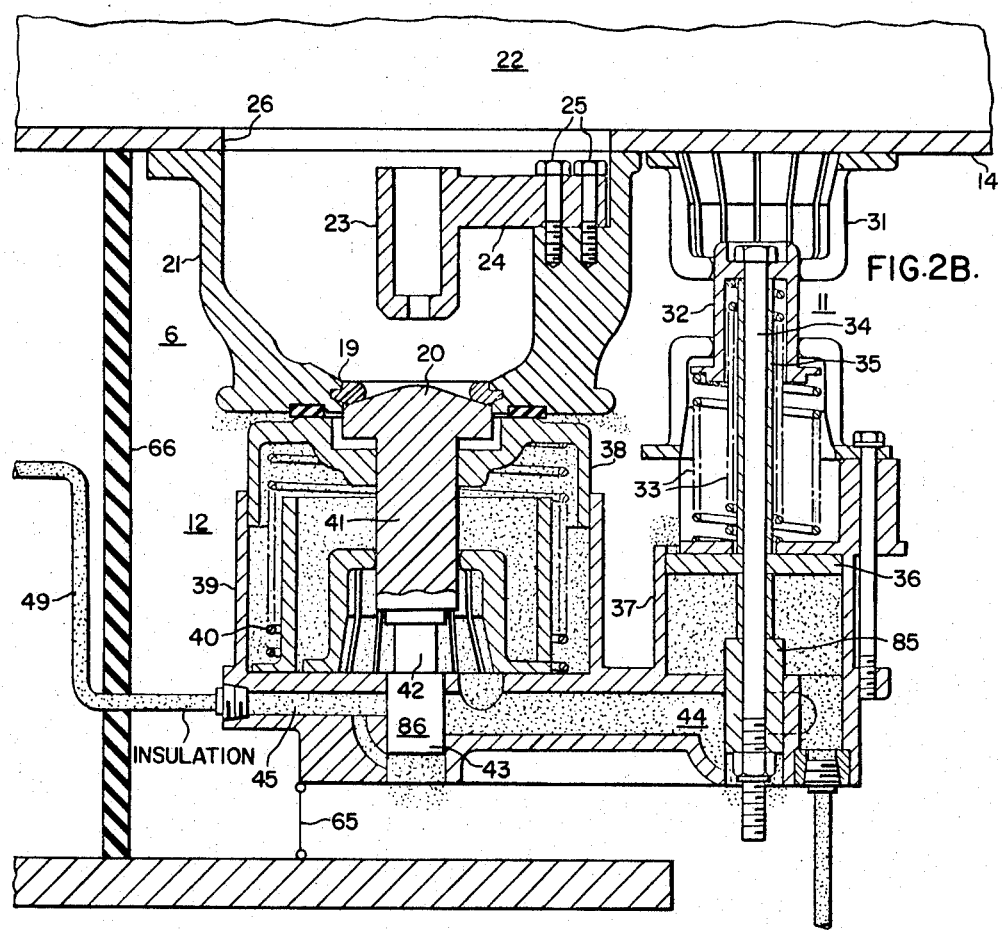
FIG.2B.
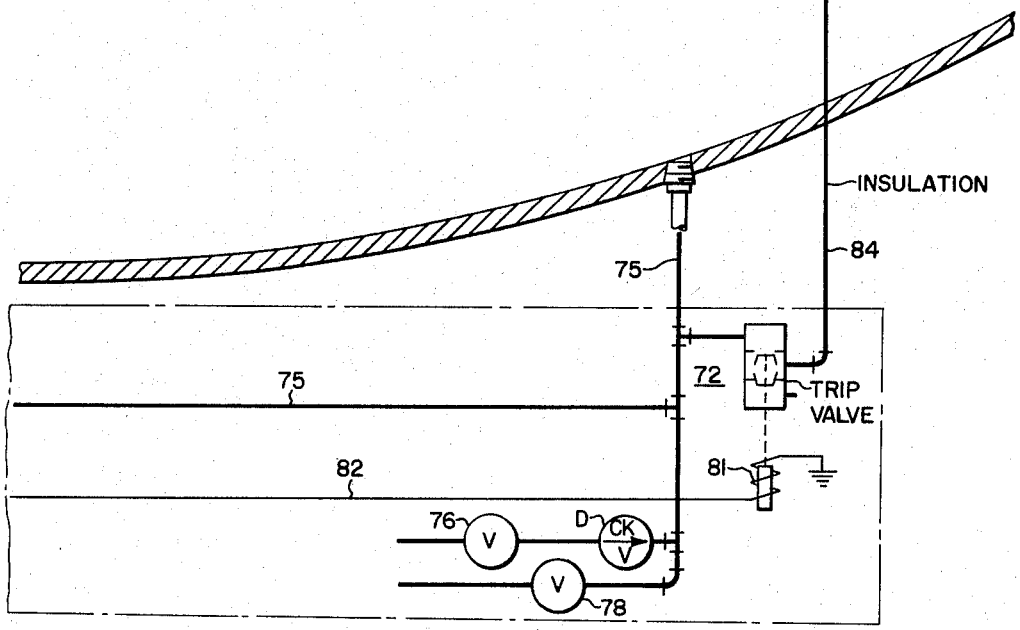

3,358,107
SIMPLIFIED PNEUMATIC CONTROL FOR COMPRESSED-GAS CIRCUIT BREAKER HAVING PRESSURIZED TANK WITH INSULATING CONTROL TUBES PRESSURIZED IN THE CLOSED-CIRCUIT POSITION
William A. Fish, Jr., Wilkins Township, Pittsburgh, and James M. Telford, Penn Hills, Pittsburgh, Pa., assignors to Westinghouse Electric Corporation, Pittsburgh, Pa., a corporation of Pennsylvania
Filed Dec. 7, 1964, Ser. No. 416,455
4 Claims. (Cl. 200—148)

ABSTRACT OF THE DISCLOSURE

A compressed-gas circuit interrupter of the pressurized tank type has arcing contacts and serially-related disconnecting contacts, both piston actuated. A three-way air-pilot-operated normally closed first valve has a tank connection to the closing side of the piston for the disconnecting contact under deenergized conditions. A two-way normally-closed second valve disposed externally of the pressurized tank controls the pilot section of the first valve through a check-valve-controlled pneumatic line. A three-way normally-open "trip" valve controls the exhausting or pressurizing of the cylinders of the arcing contacts, and an auxiliary switch has a direct pneumatic connection to the operating cylinder of the disconnecting switch structure.

---

This invention relates, generally, to compressed-gas circuit breakers and, more particularly, to control systems for controlling the operation of circuit breakers of the type described in a copending application Serial No. 59,882, filed October 3, 1960, now U.S. Patent 3,214,540 issued October 26, 1965.

Prior compressed-air breakers are operated by pneumatic cylinders disposed inside the breaker reservoir and attached directly to the individual interrupters and contacts. The operating cylinders are controlled by pressurizing or exhausting them in the proper sequence through insulating tubes connected to control valves. The prior control systems require control and exhaust valves which are complicated in structure and expensive to manufacture and maintain.

An object of this invention is to provide a simplified, direct-acting system for controlling the operation of a compressed-gas circuit breaker.

Another object of the invention is to provide for utilizing a small number, as compared to prior systems, of standard, commercially available valves for controlling the operation of a compressed-gas circuit breaker.

A further object of the invention is to perform the functions of an exhaust valve and a trip valve by means of the trip valve, thereby eliminating the exhaust valve.

Still another object of the invention is to provide a more positive indication of the position of the contact members of a compressed-gas circuit breaker than is provided in prior control schemes.

A still further object of the invention is to provide a control system in which no control tube is at atmospheric pressure when the contact members of a compressed-gas circuit breaker are in the closed position, where the breaker is most likely to encounter voltage surges.

Other objects of the invention will be explained fully hereinafter or will be apparent to those skilled in the art.

In accordance with one embodiment of the invention, the number of valves required to control the operation of a compressed-gas circuit breaker is reduced by charging and exhausting the interrupter units of the breaker directly through a trip valve, thereby eliminating the exhaust valve. Also, the valves previously utilized for controlling the auxiliary switch and position indicator operating cylinder are eliminated and a sensing line responsive to the pressure condition controlling the position of an isolating switch contact is connected directly to the auxiliary switch operating cylinder, thereby providing a more positive indication of the position of the isolating contact members.

Figure 1:
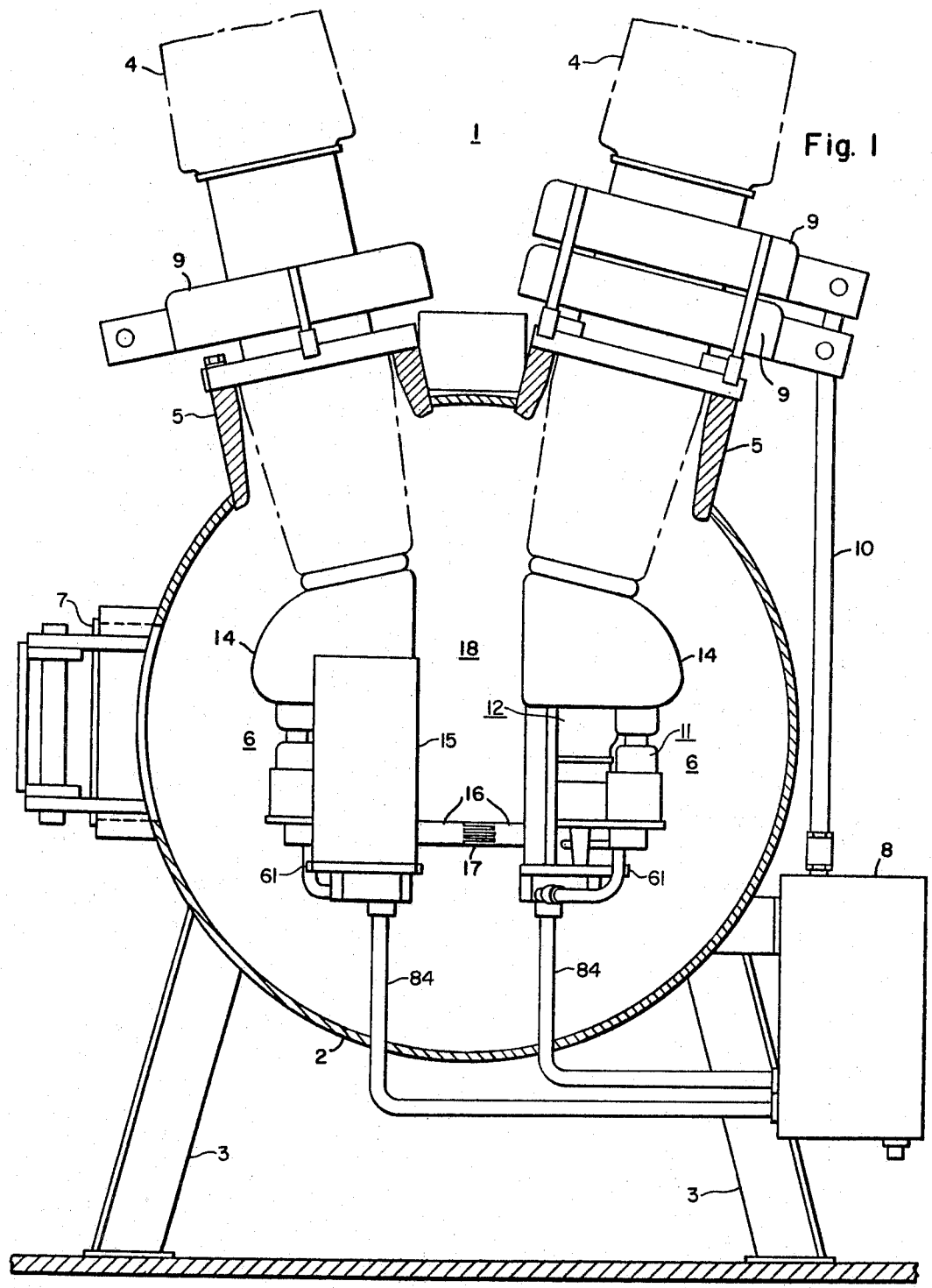
Figure 2A:
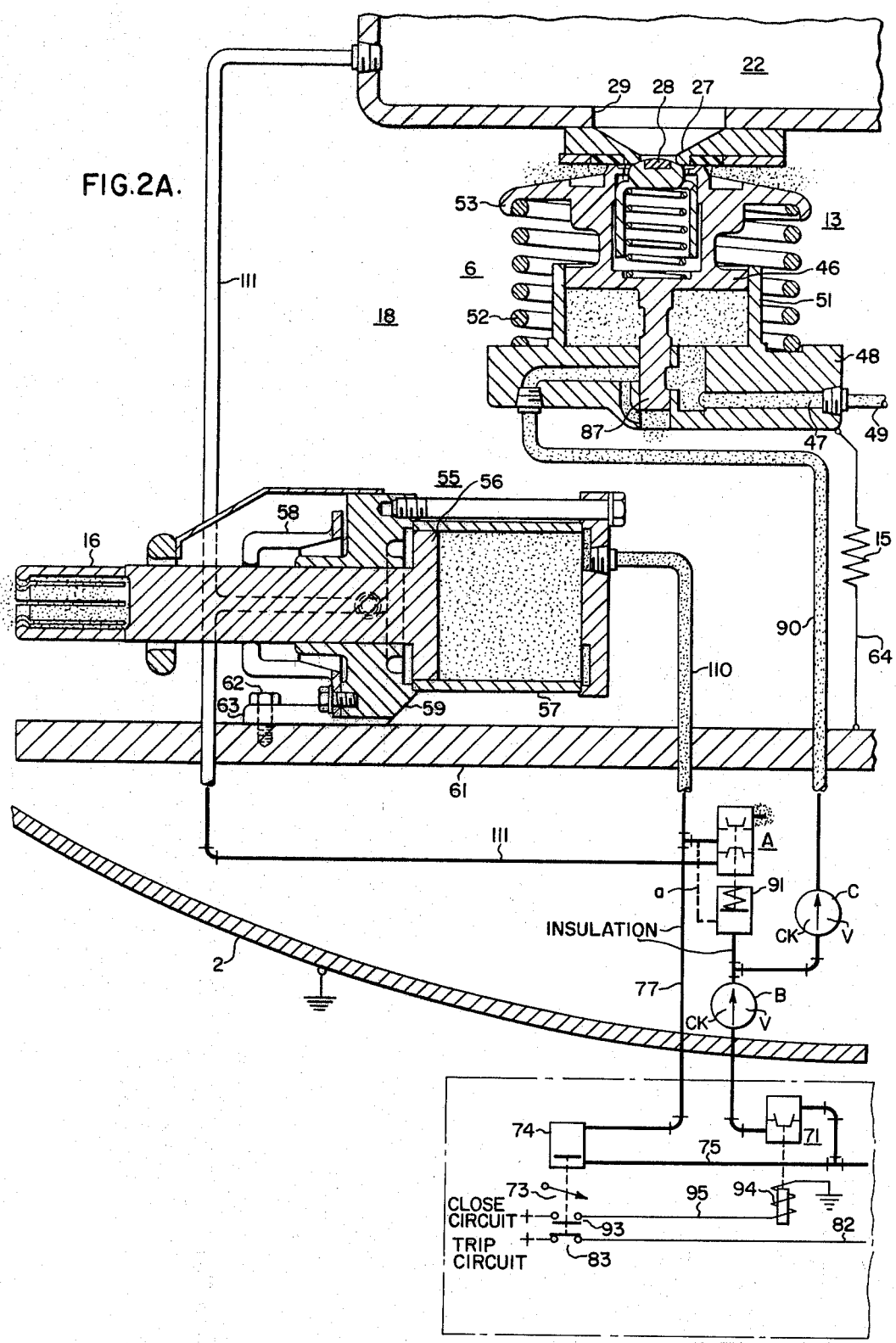

For a better understanding of the nature and objects of the invention, reference may be had to the following detailed description, taken in conjunction with the accompanying drawings, in which:

FIGURE 1 is a view, partly in end elevation and partly in section, of a compressed-gas circuit breaker embodying principal features of the invention; and, FIGS. 2A and 2B constitute a diagrammatic view of the control system for the circuit interrupting structure of the breaker, the interrupting contact members being shown in the closed position.

Referring to the drawings, and particularly to FIG. 1, the circuit breaker 1 shown therein may be of the type described in the aforesaid Patent 3,214,540. The circuit breaker may be of a three-phase type having three pole units, only one of which is shown in the present drawing, disposed in a generally cylindrical metal tank 2 which is supported by feet 3. The tank 2 is grounded for safety reasons. An arc-extinguishing gas, such as air, is retained in the tank 2 under pressure, for example 250 p.s.i. Other arc-extinguishing gases, such as sulfur hexafluoride, $SF_6$, gas, may be utilized if desired.

Terminal bushings 4 extend downwardly through supporting sleeves 5 on the upper portion of the tank 2. Each terminal bushing contains a conductor (not shown) which carries current into the pressurized tank 2 to be interrupted by arc-extinguishing assemblages 6 disposed inside the tank 2. In the present structure the terminal conductors which are inside the bushings 4 are hollow, thereby serving to carry the exhaust arced gases out of the tank 2 following the circuit interruption.

As shown in FIG. 1, an inspection door 7 is mounted at one side of the tank 2. A control housing 8 is mounted at the other side of the tank. Current transformers 9 encircle the terminal bushings 4. Secondary wiring from the current transformers extends through a conduit 10 to the control housing 8.

As shown in FIGS. 2A and 2B, each arc-extinguishing assembly 6 includes a separable pair of main contacts 11, a pair of main interrupting contacts 12, and a pair of resistance or impedance interrupting contacts 13. Each arc-extinguishing assembly 6 is supported by an exhaust chamber 14, preferably of cast metal construction, which is secured to the lower end of one of the terminal bushings 4. A resistance or impedance 15 is connected in series with the resistance contacts 13 and serves to facilitate the interruption of the current through the main interrupting contacts 12. As well known in the art, the insertion of the impedance 15 into the circuit during a portion of the interrupting operation reduces the magnitude of the current to be interrupted.

The interruption of the resistance current by the resistance contacts or resistance interrupter 13 completely interrupts the passage of current through the arc-extinguishing assembly 6. After the interruption of the current, it is desirable to open a pair of isolating or disconnecting contacts 16 which, as shown in FIG. 1, connect the two arc-extinguishing assemblies 6 in series relation. As shown in FIG. 1, the isolating or disconnecting contacts 16 engage in the closed circuit position, as at the point 17, and they are separated at the end of the opening operation.

By providing the isolating contacts 16, which maintain the circuit open, reclosure of the main contacts 11, the main interrupting contacts 12 and the resistance contacts 13 may then be effected. Since the interior region 18 of the tank 2 contains gas at a relatively high pressure, it is obvious that the disconnecting gaps 17 for the different pole units are provided in a high dielectric strength atmosphere and, consequently, only a minimum disconnecting gap distance need be provided. Therefore, the circuit breaker may be reclosed in a relatively short time.

During an interrupting operation, the main contacts 11 are separated first, then the main interrupting contacts 12 are separated, and then the resistance contacts 13 are separated. After the separation of the resistance contacts the isolating contacts 16 are separated from each other, after which the contacts 11, 12 and 13 are reclosed. The circuit is maintained open by the separated disconnecting or isolating contacts 16. Thus, the circuit breaker may be reclosed by merely effecting reengagement of the isolating contacts 16. The structure and manner of operation of each arc-extinguishing assembly 6 is fully described in the aforesaid Patent 3,214,540. Accordingly, only a general description is given herein. Referring to FIG. 2B, it will be seen that the arc-extinguishing gas for interrupting current flow between a relatively stationary orifice contact 19 and a movable main arcing contact 20 of the main interrupting contacts 12 is exhausted operatively through a cup-shaped contact support 21 and into the interior 22 of the exhaust housing 14. To facilitate centering of the main current arc drawn through the orifice contact 19, and the receiving of a radial inward blast of gas, an arc centering horn 23 is provided. The arc horn 23 is perforated and is positioned by a supporting arm 24, which is fastened by bolts 25 to a shoulder portion of the contact support 21. An opening 26 registers with the opening through the contact support 21 and, as previously mentioned, the region 22 within the exhaust housing 14 communicates with the hollow terminal stud or conductor extending through the associated terminal bushing. Thus, the gas blast is exhausted to atmosphere externally of the tank structure 2.

Similarly, as shown in FIG. 2A, a relatively stationary orifice contact 27 and a relatively movable resistance contact 28 are separated to draw a resistance current arc, which is subjected to a gas blast from the region 18 interiorly of the tank 2, through the orifice opening and out through an opening 29 to the region 22 within the exhaust chamber 14. The gas blast is exhausted through the hollow terminal bushing 4 to atmosphere as previously explained.

As shown in FIG. 2B, the main current contacts 11 include a plurality of inwardly extending contact fingers 31 which engage a movable main contact member 32. The contact fingers 31 are attached to the bottom wall of the exhaust housing 14. The movable contact member 32 is biased upwardly by compression springs 33. The movable contact member 32 is attached by means of a piston rod 34 and a spacing sleeve 35 to a piston 36 operated vertically within an operating cylinder 37. As will be described more fully hereinafter, exhausting of the gas pressure below the piston 36 will effect downward opening movement of the piston 36 and the movable contact member 32. This will force the current passing through the main contacts 11 to flow by means of the main interrupting contacts 12 and the resistance interrupting contacts 13, FIG. 2A, although the latter will carry a relatively small proportion of the current because of the presence of the series resistance 15.

The main movable arcing contact member 20 is moved downwardly by a piston 38 movable within an operating cylinder 39 and biased upwardly in a closing direction by a compression spring 40. The lower end of a downwardly extending portion 41 of the contact member 20 which is secured to the piston 38 has a reduced spindle valve portion 42 and a lower enlarged valve spool portion 43. As a result, the valve portions 42 and 43 form a sleeve valve which prevents or permits communication between a passageway 44 and a passageway 45 leading to the region below a piston 46 of the impedance interrupting unit 13. The passageway 45 is connected to a passageway 47 in a cylinder head 48 of the interrupter 13 by means of an insulating tube 49.

The movable contact member 28 of the resistance interrupter 13 is carried by the piston 46 which operates in a cylinder 51. The piston 46 is biased upwardly by a compression spring 52 disposed between a piston head 53 and the cylinder head or body 48. When air is exhausted from below the piston 46 the pressure of the air within the tank 2 on the piston head 53 forces the piston 46 downwardly against the compression of the spring 52.

The isolating or disconnecting switch structure, which is designated generally by the reference numeral 55, includes the disconnecting contact member 16, which is actuated by pressure differences across a piston 56 movable within an operating cylinder 57. Relatively stationary contact fingers 58 bear upon the sides of the movable disconnecting contact 16 to transmit current therethrough from a cylinder head 59, the latter being electrically connected to the resistor 15. The cylinder head 59 is electrically and mechanically connected to a conducting support plate 61 by bolts 62 which extend through feet 63 on the cylinder head 59. The resistor 15 is connected to the support plate 61 by a conductor 64. The plate 61 is connected to the main interrupter unit 12 by means of a conductor 65. The support plate 61 is mechanically attached to the exhaust housing 14 by insulating support members 66, only one of which is shown in FIG. 1.

In the closed circuit position of the breaker as shown in FIG. 1, the current path extends through the hollow terminal conductors enclosed by the terminal bushings 4, the exhaust housings 14 and through the closed contacts 11, 12 and 13 to the conducting support plate 61. The current path then extends through the disconnecting contact structures 55 which are serially connected by the contact members 16 joined at the point 17.

From the foregoing description, it will be seen that the interrupter unit and the isolating switch are operated by pneumatic cylinders inside the breaker reservoir and attached directly to the individual interrupters and contact members. The operating cylinders are controlled by pressurizing or exhausting them in the proper sequence through insulating tubes. Previous control schemes require some of the insulating tubes to remain exhausted to atmospheric pressure when the circuit breaker is in the open or the closed position. The resulting column of air at atmospheric pressure between live or energized and grounded portions of the circuit breaker has poorer insulating qualities than the surrounding high pressure air, and thus limits the surge or impulse voltage the circuit breaker can withstand without flashover. A control tube of cross-sectional area adequate to exhaust the interrupters at the rate required for circuit breaker opening will flash over at a lower voltage than the ¼ inch or smaller diameter tube required for pilot or indicating pressure.

Prior pneumatic schemes have either used large diameter tubes at atmospheric pressure in one position of the circuit breaker, or have, where voltage requirements made it necessary, used special valves requiring castings with complicated and costly machining in order that atmospheric pressure would be required only in small pilot or indicating lines in the open and the closed positions of the circuit breaker. In the present system no control tubes are at atmospheric pressure in the closed position, where the circuit breaker is most likely to encounter voltage surges; only small pilot and indicating lines are at atmospheric pressure in the open position; and only standard, commercially available valves are required.

Referring to FIGS. 2A and 2B, a "close" valve 71 is a standard, solenoid operated, straightway, normally closed air or gas valve. A "trip valve" 72 is a standard, solenoid operated, three-way, normally open air or gas valve of adequate capacity to exhaust the interrupters at the desired rate. As an alternative, two or more smaller valves may be used in parallel for tripping, either by connecting the operating coils in series or parallel, or by utilizing pilot operated valves having their pilots pressurized through a common pilot valve.

Control valve A is a standard, air-pilot operated, three-way, normally closed valve with an internal bleeder connection, indicated by the dotted line "a," between the pilot section and outlet. Valves B, C and D are standard check valves.

One each of valves A, B and C is required for each interrupter. One each of the "close" and the "trip" valves and the check valve D is required per circuit breaker, or multiple trip valves may be paralleled as previously explained.

A position indicator and auxiliary switch 73 is operated by a double acting pneumatic cylinder 74, the front or stem end of which is connected to the air pressure supply source through a pipe line 75, the check valve D and a fill valve 76. Pressurizing or exhausting the rear end of the cylinder operates the piston due to the piston area differential.

A sensing, or indicating line 77 from the rear of the auxiliary switch operating cylinder 74 may be connected to the rear of one isolator cylinder, as shown, or to the pilot section 91 of one isolator control valve A. In either case, the indicating line will directly indicate the pressure condition controlling the position of the isolator contact member 16.

For purposes of this application, a normally open valve is one which passes fluid from an inlet to an outlet when the actuating coil, or the pilot section, is deenergized, or depressurized. A normally closed valve is one which passes fluid when the actuating coil, or the pilot section, is energized, or pressurized.

The reservoir 18 is filled with high pressure air, or other interrupting gas, through the valve 76 and the pipe line 75. The check valve D maintains the reservoir and the pipe line 75 at high pressure unless drained through a valve 78, or a failure of the apparatus takes place.

As shown in FIGS. 2A and 2B, the circuit breaker is in the closed position. Energizing the solenoid 81 of the trip valve 72 through a conductor 82, which is connected to any conventional trip circuit through contact members 83 of the auxiliary switch 73, closes the trip valve 72 and exhausts a tube 84 leading to the interrupters, thereby causing the main contacts 11, the interrupting contacts 12 and the resistor interrupter 13 to open in sequence and interrupt the current through the circuit breaker. The sequential operation of the interrupters 11, 12 and 13 is obtained by means of slide valves 85, 86 and 87 in the interrupter units 11, 12 and 13, respectively, in the manner fully described in the aforesaid copending application.

The opening of the resistor interrupter 13 permits the pilot sections 91 of valves A to be exhausted through check valve C and a line 90. Valves A will thus move to their normally closed position. The closing of valves A exhausts the cylinder 57 of each isolating switch 55 through a pipe line 110, the valve A and a line 111 which is connected to the exhaust chamber 22. This causes the contact members 16 of the isolating switches to be moved to their open position.

The sensing line 77 is also exhausted through the valve A and the line 111, thereby causing the auxiliary switch and position indicator 73 to move to the breaker open position. Auxiliary switch contact members 83 are opened to deenergize the trip solenoid 81 and contact members 93 are closed to set up the closing circuit for a closing operation.

Deenergizing the trip solenoid 81 permits the trip valve 72 to return to its normally open position, admitting pressure to the tube 84 to reclose the interrupters 11, 12 and 13. Reclosing the resistor interrupters 13 readmits pressure to the tubes leading to check valve C.

However, the check valves prevent air flow to the pilot sections 91 of valves A. The isolator cylinders and the auxiliary switch operating cylinder remain exhausted, maintaining the "breaker open" position. Any minor leakage which would tend to repressurize the pilots 91 of valves A and cause premature operation is drained through the internal bleeder connection "a" to the outlet and exhausted through the exhaust ports of the valves.

Since the tubes from the pilots of valves A all have a common connection at the "close" valve 71, check valves B are provided to prevent the exhausting of the pilots of all valves A by the first interrupter to open. This pneumatically interlocks each isolator with its own interrupter.

The closing operation of the circuit breaker is initiated by energizing the solenoid 94 of the "close" valve 71 through a conductor 95 and the contact members 93 of the auxiliary switch 73. Energizing the solenoid 94 opens the valve 71, admitting pressure through check valves B to the pilot sections 91 of valves A and causing them to move to the open position. This admits reservoir pressure to the isolator cylinders 57, moving the piston 56 to the closed position.

At this time, pressure is also admitted to the operating cylinder 74 through line 77, thereby operating the auxiliary switch 73 to deenergize the close solenoid 94 by opening contacts 93 and set up the trip circuit by closing contacts 83. The breaker is now ready for another tripping operation. Trapped air pressure in the pilot sections of valves A, maintained by the bleeder connection "a," holds valves A open, thus maintaining the isolator contacts 16 in the "breaker closed" position.

When air pressure is drained from the reservoir 18, valves A will remain in or move to their normally closed position, thus completely exhausting the isolator cylinders and the pilots 91 of valves A. When the reservoir is repressurized, the pilots 91 of valves A will be maintained at atmospheric pressure through the bleeder connections "a" and the exhaust ports of the normally closed valves. Therefore, the circuit breaker will always set up initially in the open position.

Previous pneumatic control schemes have required complicated and costly control units to provide interlocking and sequencing for proper circuit breaker operation. The sticking or failure to seat properly of any one of a large number of special pistons and valves was a potential cause of circuit breaker failure or malfunction. The pneumatic control scheme provided by this invention requires only a small number of standard, commercially available valves. Its simplicity, with the resulting lower cost and increased probability of trouble-free operation is an important advantage.

With previously used schemes the only external indication of the circuit breaker contact position was a pressure sensing, or indicating, line from the control unit and pressure indicating line from the outlet side of the operating valve. These two lines, connected to opposite ends of the double acting auxiliary switch operating cylinder, indicated the position of the control unit and operating valve, but gave no direct indication of the position of the contacts. In the present system, the position indicator 73 and auxiliary switch operating cylinder 74 is operated directly by the pressure which controls the isolator cylinder 57. This has the advantage of more positive indication of the contact position.

With previous schemes using a single operating valve operated by pneumatic pressure when the operating coil was energized, malfunctioning of the pilot valve or the index adapter could cause the breaker to "pump" (alternately open and close) pneumatically until the reservoir pressure was exhausted. The scheme provided by this invention uses separate, solenoid operated valves for the "close" and the "trip" functions, and cannot "pump" when used with a "non-pumping" electrical scheme.

As previously explained, in the present system no control tubes are at atmospheric pressure in the closed position, where the circuit breaker is most likely to encounter voltage surges. Only small pilot and indicating lines are at atmospheric pressure in the open position, and only standard, commercially available valves are required for controlling the operation of the circuit breaker. The present scheme is equally applicable to a simplified interrupter in which the external main contacts and/or the resistor interrupter are omitted.

Since numerous changes may be made in the above-described construction and different embodiments of the invention may be made without departing from the spirit and scope thereof, it is intended that all the matter contained in the foregoing description or shown in the accompanying drawings shall be interpreted as illustrative and not in a limiting sense.

We claim as our invention:

1. A compressed-gas circuit breaker including means defining a pressurized tank, an interrupting unit including a pair of separable arcing contacts (27, 28) and a pair of serially-related disconnecting switch contacts (16, 16) all disposed within said pressurized tank, an isolator piston (56) for moving one of said disconnecting switch contacts to the open and closed-circuit positions, a three-way normally-closed first control valve (A) having a gas-operated pilot section (91) for pressurizing or exhausting the closing side of said isolator piston (56) and disposed within the pressurized tank adjacent the disconnecting switch contacts, an operating piston (46) movable within a cylinder for opening one of said arcing contacts, a main exhaust second valve (72) for pressurizing or exhausting the closing side of said operating piston (46), a check-valve-controlled pneumatic line (90) pneumatically interconnecting the closing side of said operating piston (46) with the pilot section (91) of said first control valve (A), and a check-valve-controlled pneumatic line (71a) pneumatically interconnecting the pilot section (91) with a two-way normally-closed third "close" valve (71) to pressurize the pilot section (91) and thereby open the first control valve (A) to close the isolator piston (56).

2. The combination of claim 1, wherein an auxiliary switch is provided and the pneumatic cylinder thereof has a direct pneumatic connection to the closing side of the isolator piston (56).

3. The combination of claim 1, wherein a resistance is in series with the contacts (27, 28) and a pair of arcing contacts (19, 20) in parallel with said contacts (27, 28) are pneumatically actuated first in sequence by said main exhaust second valve (72).

4. The combination of claim 2, wherein a resistance is in series with the contacts (27, 28) and a pair of arcing contacts (19, 20) in parallel with said contacts (27, 28) are pneumatically actuated first in sequence by said main exhaust second valve (72).

References Cited
UNITED STATES PATENTS

| | | | |
|---|---|---|---|
| 2,783,338 | 2/1957 | Beatty | 200—148 |
| 3,214,540 | 10/1965 | Schrameck et al. | 200—148 |
| 3,311,726 | 3/1967 | Fish | 200—148 |

ROBERT S. MACON, *Primary Examiner.*